US008884484B2

(12) United States Patent
Krauth et al.

(10) Patent No.: US 8,884,484 B2
(45) Date of Patent: Nov. 11, 2014

(54) DC MOTOR HAVING A UNIQUE WINDING STRUCTURE

(75) Inventors: Wolfgang Krauth, Achern-Sasbachried (DE); Tilo Koenig, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 152 days.

(21) Appl. No.: 13/148,539

(22) PCT Filed: Dec. 14, 2009

(86) PCT No.: PCT/EP2009/067023
§ 371 (c)(1),
(2), (4) Date: Nov. 7, 2011

(87) PCT Pub. No.: WO2010/088997
PCT Pub. Date: Aug. 12, 2010

(65) Prior Publication Data
US 2012/0043834 A1    Feb. 23, 2012

(30) Foreign Application Priority Data
Feb. 9, 2009   (DE) .......................... 10 2009 000 707

(51) Int. Cl.
*H02K 3/50* (2006.01)
*H02K 3/47* (2006.01)
*H02K 3/28* (2006.01)
*H02K 3/46* (2006.01)

(52) U.S. Cl.
CPC ........................................ *H02K 3/47* (2013.01)
USPC .............................. 310/71; 310/214; 310/260

(58) Field of Classification Search
USPC ...................................... 310/43, 71, 214, 260
IPC ...................... H02K 3/28,3/38, 3/46, 3/50, 3/34
See application file for complete search history.

(56) References Cited

U.S. PATENT DOCUMENTS

| 3,590,301 | A  | * | 6/1971  | Woydt ........................... 310/269 |
| 3,912,955 | A  | * | 10/1975 | Simpson ........................ 310/260 |
| 3,922,575 | A  | * | 11/1975 | Sauer ............................. 310/214 |
| 4,259,603 | A  | * | 3/1981  | Uchiyama et al. .......... 310/68 B |
| 5,525,850 | A  |   | 6/1996  | Stinson |
| 5,794,884 | A  | * | 8/1998  | Dolgas et al. .................... 29/596 |
| 7,064,470 | B2 | * | 6/2006  | Yokoyama et al. ........... 310/260 |
| 7,821,173 | B2 |   | 10/2010 | Bertolini et al. |

FOREIGN PATENT DOCUMENTS

| GB | 1494598   |   | 12/1977 |             |
|----|-----------|---|---------|-------------|
| GB | 1494598 A | * | 12/1977 | ............... H02K 3/46 |
| GB | 2310766 A | * | 9/1997  | ............... H02K 3/38 |
| JP | 5765583   |   | 4/1982  |             |

OTHER PUBLICATIONS

PCT/EP2009/067023 International Search Report.

* cited by examiner

*Primary Examiner* — Michael Andrews
(74) *Attorney, Agent, or Firm* — Michael Best & Friedrich LLP

(57) ABSTRACT

The invention relates to a DC motor 1 comprising a cylindrical coil carrier 7; 17 comprising wire guide element 9; 10, 12 for guiding a first winding wire 80; 180 and a second winding wire 81; 181 of an air-gap winding on both side end sections, wherein the first winding wire 80; 180 and the second winding wire 81; 181 each comprise rectangular winding segments 20; 120, wherein the rectangular winding segments 20; 120 of the second winding wire 81; 181 are disposed overlapping on the cylindrical coil carrier 7; 17 and the wire guide elements 9; 10, 12 are designed for guiding the first winding wire 80; 180 and the second winding wire 81; 181 past each other.

9 Claims, 4 Drawing Sheets

DC MOTOR HAVING A UNIQUE WINDING STRUCTURE

BACKGROUND OF THE INVENTION

The invention relates to a DC motor comprising a cylindrical coil carrier, which comprises wire guide elements for guiding a first winding wire and a second winding wire of an air-gap winding on both side end sections.

A DC motor refers to an electric motor, which is operated with direct current, or a generator which reversely converts mechanical energy into electrical current. DC motors consist of a stationary part, the stator, and a rotably mounted part, the rotor. DC motors can have a rotor designed as an internal or external rotor. In the case of an internal rotor, the rotor is the internal part and the stator is the external part of the DC motor. External rotors have a reversed disposal of the rotor and the stator.

DC motors comprising an air-gap winding are preferably denoted as brushless DC motors, electronically commutated DC motors or also bell-shaped rotor motors and are characterized by the fact that air-gap windings are preferably designed as double stranded air-core coils having an air gap, in which the coil windings travel, that the DC motor develops no cogging torque and that said motor can rotate completely freely. In addition, air-gap windings have low mechanical vibrations, a high running smoothness as well a low inductance.

A DC motor comprising an air-gap winding is known from the German patent publication DE 20 2006 007 619 U1. The air-gap winding has a multilayer configuration and is designed as a wave winding having winding directions which extend obliquely, whereby a great deal of effort is invested in configuring the winding. The air-gap winding is embodied as an ironless winding, which rotates in the air gap and is mechanically commutated. The winding wire of the coil winding is a heat-bonding wire. After the production of said coil winding, a baking process is executed because the winding is the rotating part of the DC motor and therefore must form a compact unit.

SUMMARY OF THE INVENTION

It is the aim of the invention to provide a DC motor having a simple deposition and guidance of the winding wire during the production of an air-gap winding.

The invention constitutes a DC motor comprising a cylindrical coil carrier. The coil carrier comprises wire guide elements for guiding a first winding wire and a second winding wire of an air-gap winding on both side end sections. The first winding wire and the second winding wire each comprise rectangular winding segments, wherein the rectangular winding segments of said first winding wire and the rectangular winding segments of said second winding wire are disposed overlapping on the cylindrical coil carrier. The wire guide elements are designed for guiding said first winding wire and said second winding wire past each other.

The advantage of the DC motor according to the invention is that a simple design of the winding as an air-gap winding is achieved, whereby a very smooth and low-loss running of the motor is facilitated. In addition, said motor has an operation completely free of cogging torque. Only very few components are required for the construction of said DC motor, whereby the weight can be reduced and the production can be simplified. The winding wire also does not have to be baked or cast if it is disposed on the rotating part of said DC motor. As a result, the production time is reduced.

In one embodiment of the invention, the two side end sections of the coil carrier are pluggable and of annular design and preferably are connected to one another via an annular member. The annular member thereby has a smaller diameter than the end sections. Additionally a laminated sheet package is disposed in the region of the annular member. Because the individual components only have to be inserted on top of one another, this modular configuration facilitates a simple production of the DC motor.

In a further embodiment of the invention, an end section of the coil carrier is designed lid-like, a bearing seat having a bore hole being centrally located on said end section. This configuration facilitates a simple assembly of the DC motor.

According to a further embodiment of the invention, both side end sections of the coil carrier comprise in each case a regular arrangement of support brackets serving as wire guide elements. In so doing, the first and the second winding wire are alternately guided laterally along the support brackets and on said support brackets. In addition, the support brackets have a u-shaped groove for fixing said first and said second winding wire on said support brackets. Said first winding wire and said second winding wire are guided past each other by means of this design, whereby a simple guidance of the air-gap winding results.

In a further embodiment of the invention, knobs are provided as wire guide elements on both side end sections of the coil carrier, the first and the second winding wire being alternately guided along the knobs. The knobs on the two side end sections are disposed such that the overall length of said first winding wire and said second winding wire is preferably the same. The same resistance results for both windings as a result of the equal overall length of said first and said second winding wire, and the voltage is also kept the same in shape and height as a result of the equality of the two areas in the flooded region.

In a further embodiment of the invention, the coil carrier additionally has four annular fixing elements and a regular, spaced arrangement of top pieces serving as wire guide elements. The fixing elements are disposed offset to one another in a way that the top pieces lie opposed to segments without the same. As a result, the first winding wire is guided over the top pieces of the first fixing elements and the second winding wire over the top pieces of the second fixing elements. The fixing elements are furthermore disposed on both sides of the laminated sheet package. The embodiment of the air-gap winding is facilitated by this configuration because channels for guiding the winding wire are predefined. In addition, a simple design of the DC motor is ensured as a result of the components being inserted on top of one another.

Moreover, the coil carrier is made from plastic according to a further embodiment of the invention. Because plastic can be easily injection molded into complex forms, a cost effective multifunctional part is thus formed.

BRIEF DESCRIPTION OF THE DRAWINGS

The invention is explained below in detail using exemplary embodiments having references to the accompanying drawings. The following are shown in the drawings.

DETAILED DESCRIPTION

Figure 1:
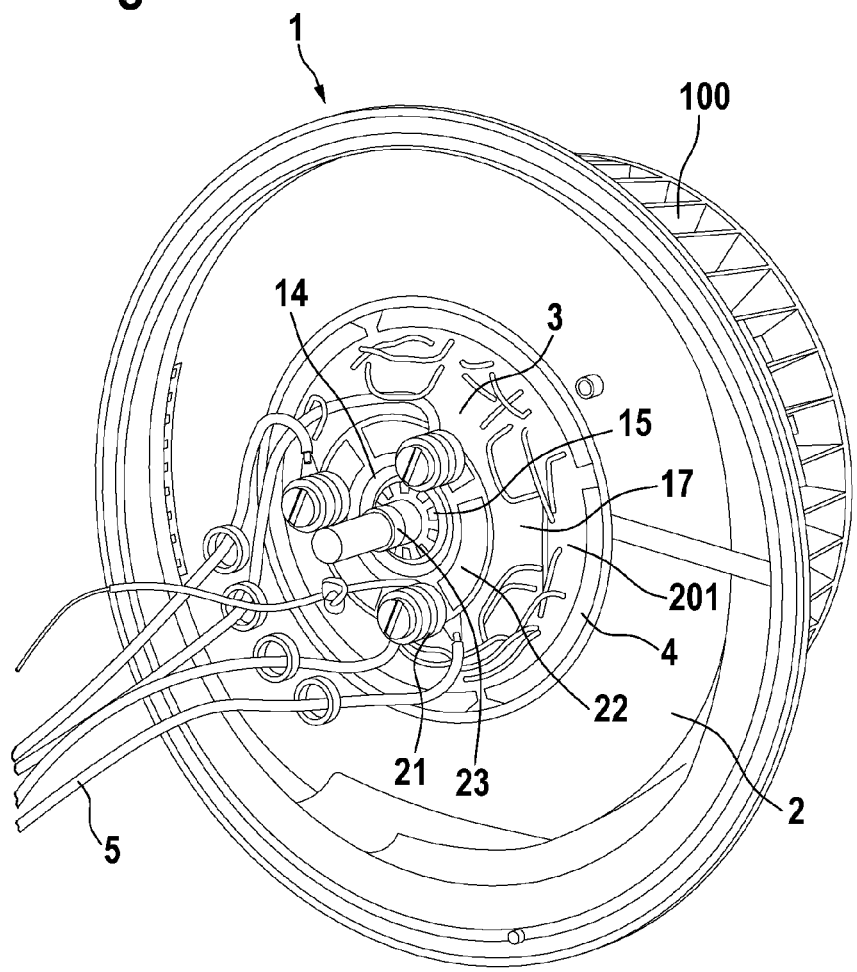
FIG. 1 a DC motor according to the invention.

FIG. 1 shows a DC motor 1 according to the invention, which comprises a rotor 2 and a stator 3. The DC motor 1 is designed to have an external rotor, wherein the rotor 2 has a permanent magnet 4 and the stator 3 has a coil carrier 17 for a multi-stranded winding. The coil carrier 17 has the form of a cylinder having a lid-like end section 201.

A bearing seat 14 for accommodating a bearing 15 is disposed centrally in the lid-like end section 201 of the cylindrical coil carrier 17. The bearing 15 is pre-installed in the bearing seat 14 of the coil carrier 17. A shaft 23 of the DC motor 1 is disposed in the bearing 15. In addition, three connector mounts 21 are respectively disposed around said bearing seat 14 in said lid-like end section 201 of said coil carrier 17. Connectors 5 are fastened on the connector mounts 21, said connectors 5 being connected to the conductor ends of the winding on the coil carrier 17. In addition, three air holes 22 are provided on the lid-like end section 201 of said coil carrier 17.

The rotor 2 of the DC motor 1 is enclosed by a radial fan 100. A radial fan 100 draws in air parallel or axially to the shaft of said radial fan 100, and the air is redirected by means of the rotation of the radial impeller about an angle of 90E and is blown out radially. There are radial fans with and without housings which either aspirate air on one side or on both sides. The modular configuration of the DC motor 1 allows for a simple production thereof because the individual components only have to be inserted on top of one another.

Figure 2:
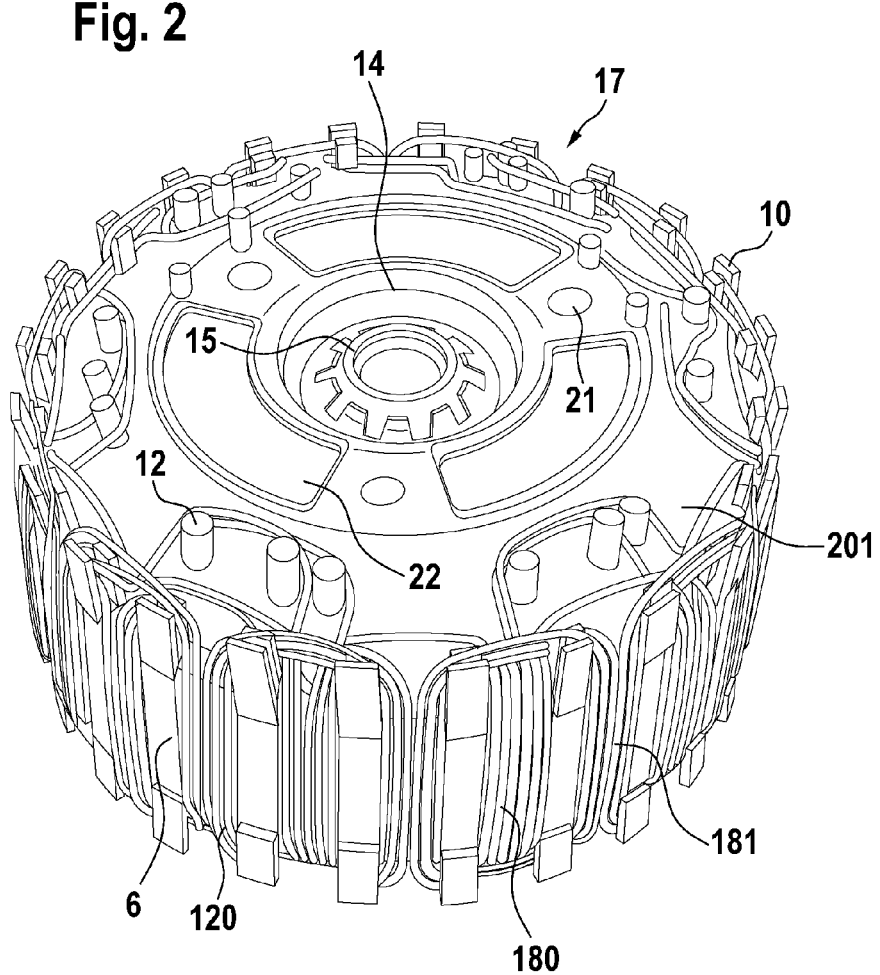
FIG. 2 a first embodiment of a stator having an air-gap winding in a DC motor according to the invention.
Figure 3:
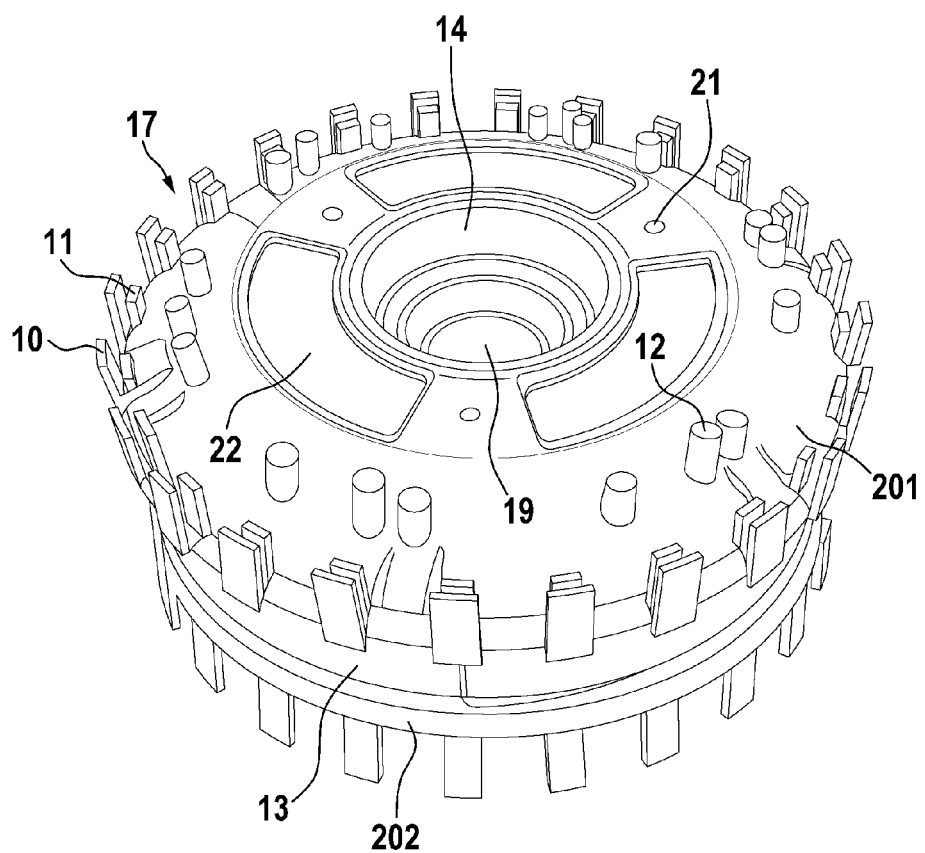
FIG. 3 the first embodiment shown in FIG. 2 without an air-gap winding.

FIG. 2 and FIG. 3 show the stator 3 in a first embodiment, wherein the coil carrier 17 is depicted without a laminated sheet package 6 as well as without an air-gap winding in FIG. 3. The bearing seat 14 containing a bore hole 19 is configured in the center of the lid-like end section 201, 202 of the coil carrier 17. The bearing 15 of the DC motor is inserted into this bore hole 19 of the bearing seat 14. In addition, three connector mounts 21 as well as three air holes 22 are depicted around said bearing seat 14.

The cylindrical coil carrier 17 is of a two-part configuration, wherein a further end section 202 is provided next to the lid-like end section 201, said further end section also preferably being configured in a lid-like fashion. Wire guide elements 10, 12 are provided on both of the side end sections 201, 202. Said side end sections 201, 202 of the coil carrier 17 are pluggable and of annular design and are preferably connected to one another via an annular member 13, which is shown in FIG. 3. The annular member 13 has a cylindrical form and has a smaller diameter with respect to said end sections 201, 202 of said coil carrier 17. The laminated sheet package 6 is disposed on the annular member 13 as shown in FIG. 2. Said laminated sheet package 6 serves as a magnetic yoke and is composed of magnetic steel sheets. Said laminated sheet package 6 is insulated with a thin insulating tape or an insulating foil. Said laminated sheet package 6 can, however, also be insulated by other means or not at all.

Both side end sections 201, 202 of the coil carrier 17 have in each case a regular arrangement of support brackets 10 serving as wire guide elements. Each support bracket 10 has a u-shaped groove 11. In addition, knobs 12 are disposed as wire guide elements on the end sections 201, 202, three knobs 12 forming a group in each case. As an alternative to the support brackets 10 and the knobs 12, wire guide elements configured in a different manner can also be arranged on said end sections.

The air-gap winding, consisting of a first winding wire 180 and a second winding wire 181, takes place on the wire guide elements 10, 12 as shown in FIG. 2. Further winding wires can additionally be provided next to the first winding wire 180 and the second winding wire. Said first winding wire 180 is guided laterally on both sides of the holder 10 and along the knob group of the upper lid-like end section 201 of the coil carrier 17. The second winding wire 181 is guided on the groove 11 of the holder 10 and along the knob group of the lower lid-like end section 202 of said coil carrier 17, which cannot be seen in the depiction in FIG. 3. The knobs 12 of the knob group of said lower end section 202 of said coil carrier 17 are disposed offset to the knobs 12 of the knob group of said upper end section 201 of said coil carrier 17 by a half winding. The air-gap winding comprises rectangular winding segments 120. The winding segments 120 are formed alternately from the first winding wire 180 to the second winding wire 181, wherein said first winding wire 180 and said second winding wire 181 are guided past each other and thereby overlap one another.

Because the first winding wire 180 is guided behind the second winding wire 181 and along the knobs 12 of the upper end section 201 of the coil carrier 17 and the second winding wire 181 is guided in front of the first winding wire 180 and along the knobs 12 of the lower end section 202 of said coil carrier, said first winding wire 180 and said second winding wire 181 preferably have the same overall length of the air-gap winding. In so doing, said first winding wire 180 and said second winding wire 181 have the same resistance, the magnetic flow through the winding also being held constant.

In the embodiment shown in FIG. 2, altogether twelve winding segments 120 of the first winding wire 180 and twelve winding segments 120 of the second winding wire 181 are provided. Additional or fewer winding segments can however be provided. The winding segments 120 of the first and second winding wire 180, 181 are in each case wound as one piece. As a result, both winding wires 180, 181 have in each case a beginning and an end.

The twelve winding segments 120 of the two winding wires 180, 181 form in each case six north poles and six south poles when energized in alternating sequence. In addition, the twelve winding segments 120 of the first winding wire are displaced with respect to the twelve winding segments 120 of the second winding wire 181 by the number of half a winding segment 120. In so doing, the south pole of the two winding wires 180, 181 successively follows the north pole of said two winding wires 180, 181. The arrangement of the poles can alternatively be changed. When said two winding wires 180, 181 are reversely energized, the poles formed by them also reverse.

Figure 4:
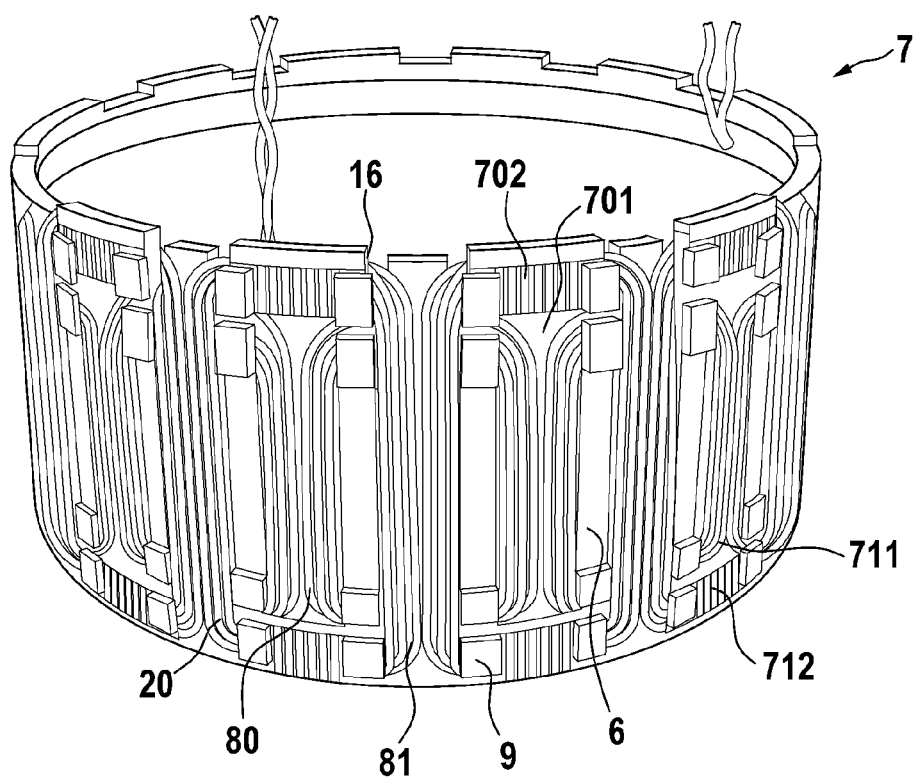
FIG. 4 a second embodiment of a stator having an air-gap winding in a DC motor according to the invention.

FIG. 4 shows the stator 3 according to a second embodiment. A cylindrical coil carrier 7 is annularly configured and disposed on a laminated sheet package 6. The laminated sheet package 6 serves as a magnetic yoke and is composed of magnetic steel sheets stacked one on top of the other. The magnetic steel sheets are electrically insulated toward the outside with a thin insulating tape or insulating foil. The laminated sheet package 6 can, however, be produced and insulated in another fashion.

The coil carrier 7 comprises four fixing elements 701, 702, 711, 712, wherein two fixing elements 701, 702, 711, 712 are in each case attached on both sides to the laminated sheet packages 6. In addition, the second fixing element 702, 712 is in each case attached to the first fixing element 701, 711. This configuration advantageously lends itself to a simple assembly of the individual components.

The fixing elements 701, 702, 711, 712 have a regular, spaced arrangement of top pieces 9 serving as wire guide elements. The top pieces 9 serve to simplify the air-gap winding and have channels 16 for the guiding of wires. In addition, the first fixing elements 701, 711 are disposed offset to the second fixing elements 702, 712 in such a way that the top pieces 9 of the one fixing element lie opposed to segments of the other fixing element which do not have top pieces. In so doing, a first winding wire 80 is guided over said top pieces 9 of the first lower fixing elements 701, 711 and a second winding wire 81 over said top pieces 9 of the second upper fixing elements 702, 712, said first winding wire 80 being guided behind said second winding wire 81. As a result, said first winding wire 80 and said second winding wire 81 overlap one another without creating a short circuit.

The air-gap winding is divided up into rectangular winding segments 20, wherein the winding segments 20 are alternately formed from the first winding wire 80 and the second winding wire 81 and said winding segments 20 overlay one another. Because said first winding wire 80 is guided on the top pieces 9 of the lower fixing elements 701, 711, the winding segments 20 of said first winding wire 80 are configured shorter than the winding segments 20 which are formed by said second winding wire 81. This is the case because said winding wire 81 is guided on the top pieces 9 of the upper fixing elements 702, 712. As an alternative to the top pieces 9, other wire guide elements can also be disposed.

The coil carrier 7, 17 of the first and second embodiment is preferably made of plastic. Plastic can be relatively cost effectively produced in complex forms in comparison to metal or a ceramic material, has a low electrical conductivity and has a relatively low density. The weight of the coil carrier 7, 17 can thereby be reduced. Other insulating materials can, however, be used.

The first winding wire 80, 180 and the second winding wire 81, 181 shown in the first and second embodiments are designed as enameled copper wires. The enameled copper wire is coated with a layer of electrically insulating varnish. The thickness and the weight of insulating varnish are very small in comparison to other insulating materials which produce the same effect.

The wire guide elements 9, 10, 12 on both of the end sections 201, 202 of the coil carrier 7, 17 are designed in the depicted embodiments such that the first winding wire 80, 180 and the second winding wire 81, 181 are guided past each other, wherein said first winding wire 80, 180 and said second winding wire 81, 181 overlap one another. This facilitates a simple construction of the winding as an air-gap winding, whereby a smooth and low-loss operation of the motor is ensured. Furthermore, the winding wire does not have to be baked or cast if it is disposed on the rotating part of the DC motor. The production time can thereby be reduced.

The invention claimed is:

1. A DC motor comprising a cylindrical coil carrier (7; 17) comprising first wire guide elements (10) and second wire guide elements (12) for guiding a first winding wire (80; 180) and a second winding wire (81; 181) of an air-gap winding on an upper side end section (201) and a lower side end section (202), characterized in that the first winding wire (80; 180) and the second winding wire (81; 181) each comprise substantially rectangular winding segments (20; 120), wherein the substantially rectangular winding segments (20; 120) of said first winding wire (80; 180) and the substantially rectangular winding segments (20; 120) of said second winding wire (81; 181) are disposed overlapping on the cylindrical coil carrier (7; 17) and the first and second wire guide elements (10, 12) are designed for guiding said first winding wire (80; 180) and said second winding wire (81; 181) past each other, wherein the second wire guide elements (12) are knobs disposed on the ends of the upper and lower side end sections (201, 202), and wherein the first winding wire (180) is guided only along the knobs (12) disposed on the upper side end section (201) and the first wire guide elements on the lower side end section (202), and the second winding wire (181) is guided only along the knobs (12) disposed on the lower side end section (202) and the first wire guide elements on the upper side end section (201).

2. The DC motor according to claim 1, characterized in that further winding wires are provided aside from the first winding wire (80; 180) and the second winding wire (81; 181).

3. The DC motor according to claim 1, characterized in that both of the side end sections (201, 202) of the coil carrier (17) are pressure fittable and of annular design.

4. The DC motor according to claim 3, characterized in that both of the side end sections (201, 202) of the coil carrier (17) are connected to one another via an annular member (13), wherein the annular member (13) has a smaller diameter than the end sections (201, 202) and a laminated sheet package (6) is disposed in the region of said annular member (13).

5. The DC motor according to claim 1, characterized in that at least one end section (201, 202) of the coil carrier (17) is lid-like, a bearing seat (14) having a bore hole (19) being centrally located on said end section.

6. The DC motor according to claim 1, characterized in that both of the side end sections (201, 202) of the coil carrier (17) comprise in each case a regular arrangement of support brackets (10) serving as wire guide elements (10, 12), wherein the first and the second winding wire (180, 181) are alternately guided laterally along the support brackets (10) and on said support brackets (10), said support brackets (10) having in each case a u-shaped groove (11) for fixing said first and second winding wire (180, 181) which are guided on said support bracket (10).

7. The DC motor according to claim 1, characterized in that the overall length of said first winding wire (180) and said second winding (181) is substantially the same.

8. The DC motor according to claim 1, characterized in that the coil carrier (7; 17) is made from plastic.

9. The DC motor according to claim 1, wherein the second wire guide elements (12) disposed on the upper end section (201) are staggered by half a wrap to the second wire guide elements (12) disposed on the lower end section (202).

\* \* \* \* \*